(12) United States Patent
Schmidt et al.

(10) Patent No.: US 10,879,963 B2
(45) Date of Patent: Dec. 29, 2020

(54) METHOD AND DEVICE FOR CONFIGURING A SINGLE FREQUENCY NETWORK

(71) Applicant: IPCom GmbH & Co. KG, Pullach (DE)

(72) Inventors: Andreas Schmidt, Braunschweig (DE); Achim Luft, Braunschweig (DE); Martin Hans, Bad Salzdetfurth (DE); Maik Bienas, Schoeppenstedt (DE)

(73) Assignee: IPCom GmbH & Co. KG, Pullach (DE)

( * ) Notice: Subject to any disclaimer, the term of this patent is extended or adjusted under 35 U.S.C. 154(b) by 0 days.

(21) Appl. No.: 16/887,575

(22) Filed: May 29, 2020

(65) Prior Publication Data

US 2020/0336175 A1 Oct. 22, 2020

Related U.S. Application Data

(63) Continuation of application No. 15/549,543, filed as application No. PCT/EP2016/052924 on Feb. 11, 2016, now Pat. No. 10,720,968.

(30) Foreign Application Priority Data

Feb. 11, 2015 (EP) ..................................... 15154705

(51) Int. Cl.
*H04B 7/022* (2017.01)
*H04W 64/00* (2009.01)
(Continued)

(52) U.S. Cl.
CPC ............ *H04B 7/022* (2013.01); *H04W 16/24* (2013.01); *H04W 64/006* (2013.01); *H04W 84/005* (2013.01); *H04W 88/12* (2013.01)

(58) Field of Classification Search
None
See application file for complete search history.

(56) References Cited

U.S. PATENT DOCUMENTS

| 5,901,144 A | 5/1999 | Maki et al. |
| 2003/0235165 A1 | 12/2003 | Wang |

(Continued)

FOREIGN PATENT DOCUMENTS

| EP | 1557062 | 7/2005 |
| EP | 1557062 A1 | 7/2005 |

(Continued)

OTHER PUBLICATIONS

International Search Report for international application No. PCT/EP2016/052924, dated Mar. 17, 2016.

(Continued)

*Primary Examiner* — German Viana Di Prisco
(74) *Attorney, Agent, or Firm* — Marshall, Gerstein & Borun LLP

(57) ABSTRACT

A telecommunication system is provided comprising a Single Frequency Network, which enables the activation and respectively deactivation of base stations ($SC_n$–$SC_{n+3}$), each providing a radio cell such as a so-called Small Cell ($SC_n$–$SC_{n+3}$). Single Frequency Networks provide the advantage that no handover procedures are required for user equipment traversing several radio cells. The subject matter of the present invention provides means for a location based adaption of the transmission parameters for operating the Small Cells ($SC_n$–$SC_{n+3}$) in dependence of the location of the user equipment to be supplied.

13 Claims, 12 Drawing Sheets

(51) Int. Cl.
*H04W 16/24* (2009.01)
*H04W 88/12* (2009.01)
*H04W 84/00* (2009.01)

(56) References Cited

U.S. PATENT DOCUMENTS

| | | |
|---|---|---|
| 2005/0259619 A1 | 11/2005 | Boettle et al. |
| 2006/0245390 A1 | 11/2006 | Omoto et al. |
| 2007/0082672 A1 | 4/2007 | Fujioka et al. |
| 2008/0025240 A1 | 1/2008 | Casaccia et al. |
| 2010/0081451 A1 | 4/2010 | Mueck et al. |
| 2010/0229082 A1 | 9/2010 | Karmarkar et al. |
| 2011/0134822 A1 | 6/2011 | Lee |
| 2011/0256881 A1 | 10/2011 | Huang et al. |
| 2012/0188878 A1 | 7/2012 | Simon |
| 2013/0028210 A1 | 1/2013 | Gage |
| 2013/0029706 A1 | 1/2013 | Sachs et al. |
| 2013/0272132 A1 | 10/2013 | Heo et al. |
| 2014/0226638 A1 | 8/2014 | Xu et al. |
| 2015/0156708 A1 | 6/2015 | Tietz et al. |
| 2015/0304044 A1 | 10/2015 | Stapleton et al. |
| 2016/0227462 A1 | 8/2016 | Axmon et al. |
| 2016/0330745 A1 | 11/2016 | Miao et al. |
| 2017/0099175 A1 | 4/2017 | Tian et al. |
| 2018/0035348 A1 | 2/2018 | Axmon et al. |

FOREIGN PATENT DOCUMENTS

| | | |
|---|---|---|
| JP | 2000312177 | 11/2000 |
| JP | 2000312177 A | 11/2000 |
| JP | 2001028577 | 1/2001 |
| JP | 2001028577 A | 1/2001 |
| JP | 2009124501 | 6/2009 |
| JP | 2009124501 A | 6/2009 |
| JP | 2009246860 | 10/2009 |
| JP | 2009246860 A | 10/2009 |
| WO | 2004040933 | 5/2004 |
| WO | WO-2004040933 A1 | 5/2004 |
| WO | 2009058752 | 5/2009 |
| WO | WO-2009058752 A1 | 5/2009 |
| WO | 2009124261 | 10/2009 |
| WO | WO-2009124261 A2 | 10/2009 |
| WO | 2017082951 | 5/2017 |
| WO | WO-2017082951 A1 | 5/2017 |

OTHER PUBLICATIONS

Written Opinion of the International Searching Authority for international application No. PCT/EP2016/052924, dated Mar. 17, 2016.

| Resource Lattice @ Location 1 | | | | |
|---|---|---|---|---|
| W | W | W | W | W |
| X | X | Y | N | N |
| X | X | Y | N | N |
| X | X | Y | N | N |

| Resource Lattice @ Location 2 | | | | |
|---|---|---|---|---|
| W | W | W | W | W |
| M | N | - | N | N |
| M | N | - | N | N |
| M | N | - | N | N |

| Resource Lattice @ Location 3 | | | | |
|---|---|---|---|---|
| W | W | W | W | W |
| - | - | Y | - | - |
| - | - | Y | - | - |
| - | - | Y | - | - |

| Resource Lattice @ Location 4 | | | | |
|---|---|---|---|---|
| - | - | - | - | - |
| - | N | L | N | N |
| - | N | L | N | N |
| - | N | L | N | N |

NW Topology

"Guard Region" required.

METHOD AND DEVICE FOR CONFIGURING A SINGLE FREQUENCY NETWORK

CROSS-REFERENCE TO RELATED APPLICATIONS

This application is a Continuation of U.S. Ser. No. 15/549,543, filed Aug. 8, 2017, which is the United States national phase of International Patent Application No. PCT/EP2016/052924, filed Feb. 11, 2016, which claims the benefit of priority of EP15154705.6, filed Feb. 11, 2015, the entire contents of these applications which are hereby incorporated herein by reference.

FIELD OF THE DISCLOSURE

The present invention is directed towards a telecommunication system comprising a single frequency network, SFN, which enables the activation and respectively deactivation of particular base stations forming the SFN, each base station providing a radio cell such as a so-called small cell. SFNs provide the advantage that within the SFN no handover procedures are required for user equipment traversing several radio cells.

BACKGROUND

WO 2009/058752 A1 discloses an apparatus for receiving system information updates including a wireless transmit receive unit, WTRU, being configured to receive a system frame number. The WTRU is also configured to receive system information messages in a modification period. The modification period has a boundary determined by the system frame number. The WTRU is configured to receive system information change notification after a first modification change boundary and determines that the system information is valid until a second modification change boundary.

US 2012/0188878 A1 discloses the transmission of primary and secondary control information for user equipment, UE, to operate in a wide area SFN and a local area SFN respectively. The first control information is transmitted over the wide area SFN whereas the second control information may be transmitted over the local SFN or a dedicated channel. The first control information may contain scheduling of the second control information and the second control information may be different in different local areas within the same SFN. Local SFNs use distinct pilots or other physical channel parameters to give UEs a chance to distinguish between local SFNs. Furthermore a method to transmit local SFNs and UEs to receive these in awareness of the different SFNs and utilizing means to distinguish different SFNs is provided.

US 2008/0025240 A1 discloses first transmissions of data over an SFN and second transmissions or re-transmissions of the same data in non-SFN manner scheduled so that re-transmissions do not disturb reception of further SFN-transmissions.

US 2013/0029706A1 discloses a wireless spectrum sharing using SFN at a certain transmission power, wherein no position dependent resource usage is provided in an SFN.

WO 2009/124261 A2 discloses the provision of a program guide via an SFN that spans over the coverage area of one or more Multiple Frequency Networks MFNs and provides information about content and frequency of transmissions of the MFNs.

US 2014/0226638A1 teaches a detection of a system information broadcast in an SFN.

A further network arrangement is described in JP 2009-246860 in which a combination of directional base station transmitters and timing offsets is used. By employing directional antennas, only a relatively small region of signal overlap from neighbouring base stations results and in this region, through use of transmission timing offsets, signals from two base stations are received in this overlap region with a small time offset.

Wireless communication systems are known, which are widely deployed to provide various types of communication content to several types of end devices. Such systems may be multiple-access systems capable of supporting communication with multiple users by sharing the transmission resources, such as a frequency per time slot or in general bandwidth. Known multiple access systems are referred to as code division multiple access CDMA systems, time division multiple access TDMA systems, frequency division multiple access FDMA systems, family members of the Long Term Evolution LTE family of standards such as LTE-A and furthermore orthogonal frequency division multiple access, OFDMA, systems.

A wireless multiple access communication system supports communication for multiple wireless terminals simultaneously. A wireless communication network may include a number of base stations that can support communication for a number of wireless devices. Wireless devices comprise user equipment and remote end devices. An SFN is a broadcast network where several transmitters simultaneously transmit the same signal over the same frequency channel or over the same range of frequencies (e.g., in case of OFDMA systems such as LTE/LTE-A, over the same range of sub carrier frequencies) to user equipment. A simplified form of SFN can be established by a low power co-channel repeater, booster or broadcast translator. The aim of an SFN is efficient utilization of the radio spectrum and the avoidance of signalling efforts for handovers. An SFN also increases the coverage area compared to a Multiple Frequency Network MFN, since the total received signal strength may increase in positions between the transmitters.

In known cellular mobile radio systems, the currently existing so-called Macro Cell network topology is enhanced by the establishment of smaller radio cells, the so-called "small cells". This evolution from a homogeneous to a heterogeneous network topology is performed by installing additional base stations providing cells of small range. The mobile network operators are currently focusing primarily on the most frequented hot spots, such as train stations, shopping centres, and the like, in which a large number of mobile users are constantly present Macro cells and small cells can be operated in different frequency ranges. A macro cell layer can be established, usually by means of lower frequencies, and small cell layers are usually operated at higher frequencies. The small cells can be connected via backhaul connections to the core network of the mobile network operator.

User equipment can be transferred both within a layer as well as between a macro cell layer and a small cell layer by means of a cell handover procedure. Such a handover is based at least on the reception of basic cell specific information as well as the measurement of received field strengths being measured on the downlink reference signals, which are performed according to a predefined configuration in the mobile device. The measurement results are transmitted from the mobile end device to the serving base station, the so-called "serving eNB". During known handover procedures, the new radio cell, the so-called "target eNB", is prepared for the upcoming handover of the mobile device. This is performed by means of backhaul connections in the core network, in case of LTE via an S1 interface or between the involved base stations, in case of LTE via an X2 interface.

According to the prior art signalling overhead results from each of the cell handover procedures according to three aspects: on the air interface, in the Radio Access Network (RAN), and the Core Network (CM). Furthermore handover procedures require computing power, also in three ways: in the mobile device, in the involved base stations, and the core network. In addition, delays on the bandwidth-limited transmission paths of the networks are generated.

Due to these disadvantages, mobile devices, which are moving quickly, should not be passed frequently from one cell to another. As a result fast moving mobile devices are often kept on the macro cell layer. Thus, fast moving mobile devices often cannot benefit from the advantages the small cell layer offers.

General Description

It is therefore an object of the present invention to overcome the aforementioned problems and especially it is the object of the present invention to provide a telecommunication system, which avoids frequent handovers of fast traveling user equipment, which travels from cell to cell. Hence, the problem to be solved is to reduce signaling overhead in a resource efficient way.

Accordingly, a method for configuring a single frequency network is provided, the method comprising detecting a location of at least one user equipment and configuring at least one transmission parameter of a plurality of base stations forming the single frequency network as a function of the detected user equipment location.

The single frequency network comprises a variety of small cells, which together build a common network, which appears to the user equipment as a single network. This is due to the same transmission resources being applied within a network, such that no handovers are required from one small cell to another small cell. This user equipment, the base stations and any further network components can therefore avoid to transmit signalling information for handover purposes which provides the advantage of reduced transmission overhead along with further avoidance of efforts being implied respective signalling such as energy consumption and allocation of resources.

As sets of user equipment are only communicating with a subset of available base stations, such inactive base stations can be deactivated. Hence, when a user equipment travels from one location to another the base stations being responsible for its supply at the first location may no longer be required in the second place. The user equipment being located in the second location may require other base stations, which are now in close proximity. It is therefore an aspect of the present invention to locate the user equipment and derive a subset of required base stations at this measured location, which are then activated. The other way round, more distant base stations, which are no longer suitable for the supply of the user equipment can be deactivated.

Hence, it is an aspect of the present invention to define subsets of base stations, which are required in one case or are not required in a further case. This partitioning of the network is accomplished by defining clusters of base stations, which imply clusters of radio cells, each radio cell contributing to the overall SFN. In an MFN scenario one radio cell is distinguished from another by applying orthogonal resources, which holds for the definition of SFN clusters as well. A cluster of base stations can be defined as a number of base stations, which share the same resources, such as frequency per period of time (first SFN cluster). A further cluster of base stations and therefore radio cells may be operated using orthogonal resources (in comparison with the first SFN cluster). For interference avoidance between radio cells and/or clusters of radio cells, so-called guard regions may be installed which are discussed later on.

In general the present invention is not limited to a specific number of clusters, while clusters can be defined as lying ahead of a user equipment, being in close proximity and maybe serving the user equipment, or clusters which are already passed by the user equipment and are therefore to be deactivated. The information of the relative location of the user equipment and the base stations can be determined by known location detection techniques. This may comprise locating the position of the base stations and locating the position of the user equipment. It may furthermore be the case that at least one of the aforementioned positions is already known. A static base station may for instance transmit its location to a central device such that only the user equipment is to be located. In case the user equipment is located several times a direction and/or a velocity can be derived. Hence, one can estimate not only the current position but the further locations can be predicted. In this way it can be identified whether a user equipment is approaching a base station. Future serving cells can by activated in due time.

An activation or deactivation of base stations means to turn transmission power on or off, but the present invention is not restricted to this definition. It may be the case that the base stations are previously operated according to transmission parameters, which make the base station not perceivable by the user equipment. Activation may refer to switching transmission parameters such that the base station is operated in a way that the user equipment can perceive its presence and receive signals. Hence, activation does not require that a base station is previously completely turned off. From the perspective of the user equipment the base station becomes visible by its activation. A definition of a deactivation holds the same features, namely that a deactivation does not require a complete turning off. An activation may also imply that a first low transmission power of a base station is increased to a high transmission power and vice versa when deactivating the base station. An activation may also imply that a base station operating on resources that are momentarily invisible to the user equipment in question is assigned to a particular SFN cluster operating on resources that are visible for the user equipment (i.e. resources that are orthogonal to the resources used previously) when this is approaching, and vice versa when deactivating the base station.

The user equipment may freely be carried around by a human user or be located within or attached to a vehicle such as a train or a car. The resulting movement behaviour can be detected and the transmission parameters can be adapted accordingly. In case the carrier of the user equipment travels at high speed the base stations need to be reconfigured according to new transmission parameters within a short period of time. Furthermore, the transmission parameters can be adapted accordingly. For instance, a train passing by may require a high transmission power, while a pedestrian may require a smaller transmission power. This type of power adjustment considers the estimated time a user equipment stays within a location and therefore stays in a radio cell.

According to a further aspect of the present invention in case the user equipment approaches at least one base station this at least one base station is activated. This provides the advantage that a user equipment, which is in close proximity can be served by previously distant base stations. Further SFN areas can be established such that it is already in function a priori to the arrival of a user equipment.

According to a further aspect of the present invention in case the user equipment has passed a base station this base station can be deactivated. This provides the advantage that base stations which are no longer needed can be switched off or they can be operated under usage of adapted transmission parameters. Hence, unused base stations can provide their services to other tasks such as the establishment of a different SFN. Again, deactivating means to disconnect from the user equipment or to provide a different service.

According to a further aspect of the present invention the SFN is partitioned into clusters by operating subsets of base stations using respectively orthogonal resources. This provides the advantage that a variety of small cells can be operated under usage of the same transmission parameters and therefore a subset of available base stations can be activated and a further subset of base stations can be deactivated.

According to a further aspect of the present invention the location is detected repeatedly for estimating a movement behaviour. This provides the advantage that further locations can be interpolated and movement information such as a velocity and a direction of the user equipment can be derived. In this way a movement vector can be computed.

According to a further aspect of the present invention detecting the location is accomplished repeatedly according to one of a predefined schedule, predefined periods of time and a predefined user equipment behaviour profile. This provides the advantage that the estimations can be planned such that a situation specific movement profile is derived. In case critical situations occur the measurement rate can be increased. In case frequent changes in direction are performed by the user equipment more measurements can be taken.

According to a further aspect of the present invention the at least one transmission parameter is configured as a function of several detected locations of at least one user equipment. This provides the advantage that the movement behaviour of the user equipment can be considered for provision of transmission settings. For instance the transmission power can be increased for fast traveling user equipment.

According to a further aspect of the present invention detecting a location comprises at least one of detecting a presence of a user equipment, detecting a location of a user equipment, detecting a trajectory, detecting a direction of movement, detecting a movement behaviour, estimating a movement behaviour, reading out a provided movement profile and considering an estimated movement profile. This provides the advantage that a variety of location detection techniques can be applied. The location detection comprises direct measurements of the location as well as reading out already stored location information. Furthermore a location may be signalled by the reporting device itself, for example using information obtained using a global positioning by satellite, GPS, system.

According to another aspect of the present invention location may also be predicted for example based on the location information previously detected.

According to a further aspect of the present invention configuring at least one transmission parameter comprises forming a first cluster of base stations being operated according to a first set of transmissions parameters and forming at least a second cluster of base stations being operated according to a second set of transmissions parameters. This provides the advantage that clusters can be defined by operating base stations utilizing a first set of resources (e.g., operating on a first time-frequency-lattice) and operating other base stations utilizing a second set of resources (e.g., operating on a second time-frequency-lattice) which is orthogonal to the first set of resources. The person skilled in the art appreciates further ways for operating clusters independently. Clustered base stations may for instance be distinguished from others by a geographic distance.

According to a further aspect of the present invention a first cluster of base stations is activated as a function of the detected location and furthermore a second cluster of base stations is deactivated as a function of the detected location. This provides the advantage that location information can be used for jointly operating subsets of base stations. Furthermore the activation of a first group of base stations can trigger the deactivation of a second group of base stations and vice versa.

According to a further aspect of the present invention the user equipment is operated according to one of a group of standards, the group comprising GSM, UMTS, one of the LTE family of standards and one of the IEEE 802.11 family of standards. This provides the advantage that aspects of a variety of legacy standards can be combined with the teachings of the present invention.

According to a further aspect of the present invention the user equipment is formed by one of a group of mobile devices, mobile phones, cell phones, handheld computers, notebooks, netbooks, PDAs, pagers, tablet computers, wireless modules, wireless sensors, navigation systems and entertainment devices. This provides the advantage that aspects of variety of legacy devices can be combined with the teachings of the present invention.

According to a further aspect of the present invention a device (e.g., a cluster management unit) for performing at least one of synchronizing base stations, controlling base stations, partitioning sets of base stations, merging sets of base stations, configuring at least one transmission parameter, and provision of transmission content to the at least one base station is operated. This provides the advantage that a central device is provided for managing the network and accomplishing overall network controlling tasks.

According to a further aspect of the present invention "configuring at least one transmission parameter" comprises one of activating the base station, deactivating the base station, increasing a transmission power, decreasing a transmission power, switching between a first operational mode (e.g., MFN) and another operational mode (e.g., SFN), switching between a first transmission scheme (e.g., a first SFN cluster) and another transmission scheme (e.g., a second SFN cluster), establishing a connection between a base station and at least one user equipment and establishing a connection between a base station and at least one further base station. This provides the advantage that the transmission behaviour can be adapted to the specific situation of the user equipment. It may be required to increase transmission power (e.g., to transition from dormant state into active state) in case a user equipment is approaching. In case the movement behaviour of the user equipment requires additional communication between the base stations they can establish a connection among each other and negotiate transmission parameters.

The object is also solved by a device for configuring an SFN being formed by a plurality of radio cells, comprising a location determination unit for detecting a location of at least one user equipment and a cluster management unit being arranged to configure at least one transmission parameter of a plurality of base stations as a function of the detected user equipment location, each base station providing a radio cell.

The object is also solved by a system for configuring an SFN comprising a plurality of base stations each providing a radio cell for forming the SFN, a location determination unit for detecting a location of at least one user equipment and a cluster management unit being arranged to configure at least one transmission parameter of the plurality of base stations as a function of the detected user equipment location.

The system for configuring an SFN can be operated according to the previously defined aspects. The system may be implemented by a telecommunication provider or a network operator. A central controlling unit may be implemented or the respective functionality is distributed over a network and can be provided in a de-central fashion. The system is compatible with commonly known user equipment (i.e. legacy mobile devices already rolled out), as they can be passive. In case the user equipment do not contribute to the provided method and/or system the location detection can be accomplished on the network side or by devices being external to the user equipment.

In the following scenarios are described in which at least one mobile device is mounted on a train or vehicle in general. The person skilled in that art recognizes that these aspects are only exemplary and that the described scenarios can be handled with other carriers for transporting the mobile devices. They may for instance be carried by a person or may be attached to further moving devices. Accordingly the concepts referring to highways or railways can as well be accomplished in further scenarios.

Fast moving user equipment are for example those being operated by passengers in modern high-speed trains such as the ICE in Germany, the TGV in France or the Shinkansen in Japan. Such trains can travel at speeds of more than 250 km/h. Also car drivers with their devices as well as vehicle-mounted devices on a highway can move at high speed into a specific direction. This movement behaviour results in frequent handovers and therefore signalling overhead.

To overcome these problems network operators currently tend to supply large macro cells such that said handover scenarios occur only rarely. These devices can therefore not benefit from small cells with resulting shorter distances, a higher data rate and a lower utilization, but are supplied by the macro cells in large numbers, which brings about large effort for their operation.

The cell-based architecture of current mobile networks is built on the assumption that there is always a best cell to camp on (or to connect to) for each terminal and that it is beneficial for the network management to define exactly one serving cell. This approach is overcome by adapting to actual network topologies and new technologies. Heterogeneous networks comprise for instance overlapping large and small cells. Current standards allow for a parallel connection to several cells at the same time. Various techniques are being developed for simultaneous communication from a plurality of base stations to a user equipment in order to achieve a diversification of transmission channels.

The present invention provides an improved network architecture for supplying mobile devices by means of location static base stations BS or location static remote radio heads, RRH for short, but without the requirement of a determination of an optimal or a number of optimal supplying entities. This architecture inherently incorporates many optimizations of current architectures and furthermore the disadvantages of a single serving cell and dedicated handovers are overcome.

In an SFN, all base stations BS and remote radio heads RRH transmit approximately the same signal. Hence, it makes no difference in the receiving terminal from which BS or RRH respectively a signal is received. In case signals from several physically different channels are superimposed, they will be handled as a plurality of delayed reception paths of a single transmitter. The mobility of a terminal within an SFN does not require handovers as the terminal which departs out of the area served by the first base station (or RRH) into the coverage area of a second base station (or RRH) will always receive the same signal. Resources being used in a single frequency network are always used synchronously and for the same content. Content being specifically provided for a single end device is also broadcast in regions being out of the range of the end devices. Therefore, single frequency networks SFN are typically used for data broadcasting, the so-called broadcast mode.

This invention is generally not limited to small cells but rather addresses all kinds of base stations BS or remote radio heads RRH, while the person skilled in the art appreciates further ways to establish a number of radio cells and respective hardware components for their operation.

The present invention provides a position dependent single frequency network SFN that can be implemented by installing multiple concatenated small cells for instance along railroad tracks or highways. Hence, a plurality of terminals along a route, for instance a railway track or a motorway, can be supported by many small cells of a digital SFN being operated according to the LTE standard.

The SFN holds benefits as well as drawbacks, which are overcome according to the present invention. Advantages of handover prevention are at least that there is no handover preparation and no signalling, which would require additional effort. Furthermore the disadvantages of relatively small cells for fast moving terminals are overcome. The advantages of small cells and a better supply of user equipment are also granted for fast moving terminals.

The disadvantage of an SFN is the resource consumption, which applies to the entire SFN as the SFN is handled as a single cell. The subject matter of the present invention is contrary to the described techniques as it uses resources within an SFN for different terminals differently and thus sends different signals and data. This means an adaption of currently known SFNs, which can be performed with adaptions of respective protocol stacks. Hence, this aspect of the present invention can be realized straight forwarded with only minor adaptions of legacy systems. A key aspect of the present invention is the highly dynamic formation of distinct SFN clusters of reduced dimension within an SFN of large dimension and establishment of guard regions between said SFN clusters, so that different signals and data can be transmitted to different groups of terminals.

The criteria for such a resource usage are based on the distance of the supplied terminals or on the knowledge that the signals that are transmitted to different terminals do not significantly interfere with each other. Resources that differ sufficiently in time, frequency or code domain are defined as being orthogonal. Furthermore, resources are orthogonal in case the spatial distance is sufficiently large. Also, a virtual distance which is obtained by isolation or interference avoidance leads to orthogonal resources. Resources which are free of interference due to their geographical distance may overlap in time, frequency or code domain and still carry different signals without any distortion.

The distance of end devices can be determined for instance in an SFN being defined by a plurality of small cells by the small cells themselves or for instance by a central position determining unit. An uplink communication can be provided via the small cells, such that the small cells are able to indicate a geographic position, which can then be considered for adapting network parameters according to an aspect of the present invention.

A centrally located Resource Control Unit, RCU, may provide resources via small cells within the SFN to the end devices, which are orthogonal in frequency, time or code domain within the same small cell or within adjacent small cells. Resources being assigned to small cells or devices of sufficient distance from each other, which are orthogonal due to their distance, may be identical or at least not orthogonal in time, frequency and code domain. This is the case as they are already orthogonal because of their distant locations. Therefore small cells and their terminals connected to them can be dynamically divided into SFN clusters as a function of their respective position. Within each SFN cluster resources are to be allocated orthogonally to each other. The SFN clusters are at a sufficient distance already orthogonal regarding their resources.

There is a need to operate only a subset of small cells, which are required for communication with a user equipment within an SFN cluster. In the example of the train those small cells in front of the train and behind the train, which are not in use, are disabled or at least are deactivated, for instance based on the distance between the corresponding SFN-cluster, for energy saving purposes or for use as a different SFN cluster. Hence, the active small cells of the SFN seem to move with the train as they are only active at the train's presence. Only those cells in close proximity to the user equipment are activated. According to the present invention a close proximity can be detected by location measurements, which are for instance compared to a pre-defined radius. Such a radius can be dynamically defined by adaption of transmission power.

BRIEF DESCRIPTION OF THE DRAWINGS

The invention will now be described merely by way of illustration with reference to the accompanying drawings in which.

DETAILED DESCRIPTION

In the following same notions will be denoted with the same reference signs unless indicated otherwise.

Figure 1:
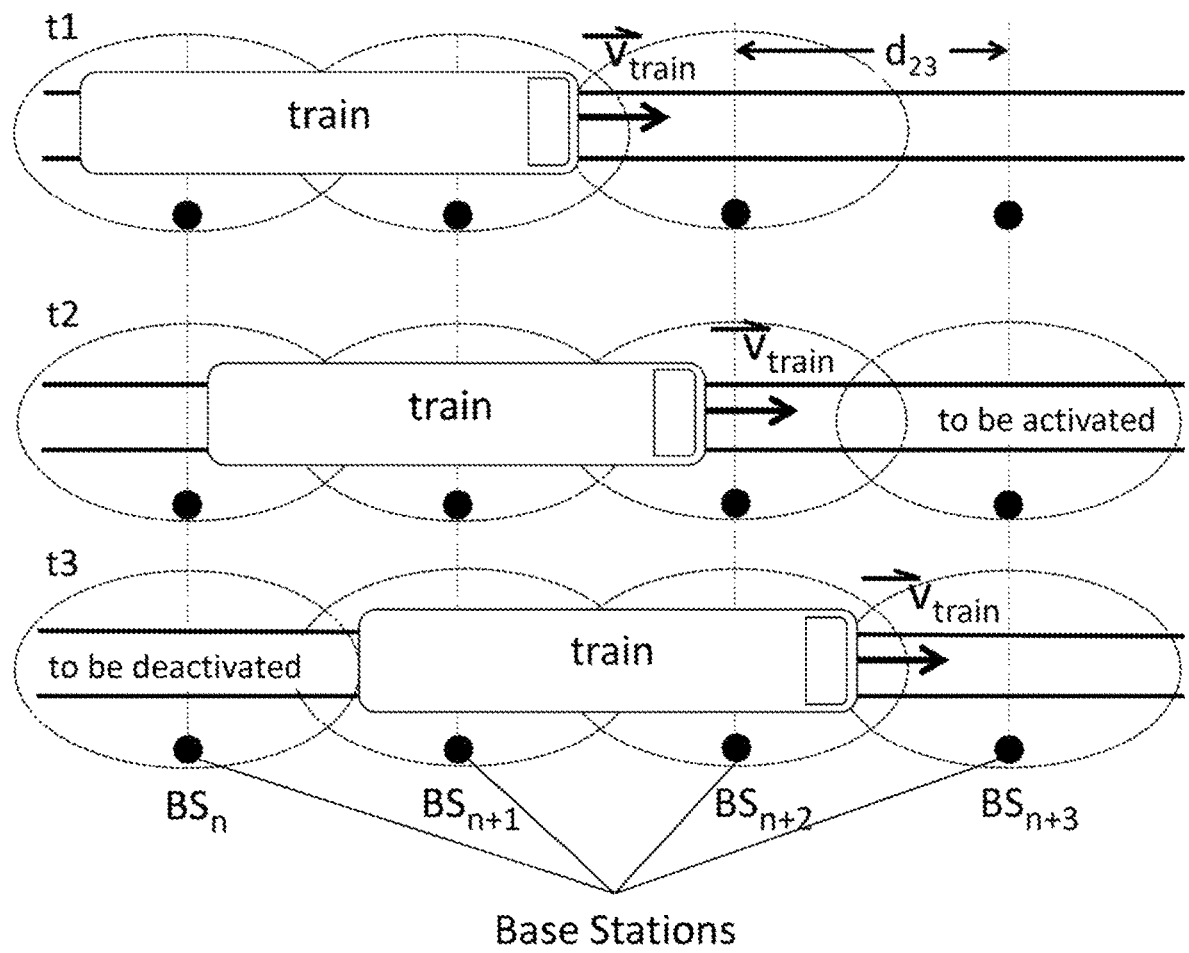
FIG. 1 shows an SFN with a moving vehicle, here a railway train, and a small cell activation and deactivation procedure according to an aspect of the present invention.

FIG. 1 shows an SFN with a moving vehicle in the form of a train at three time instances and a small cell activation and deactivation procedure according to an aspect of the present invention. During the journey of the train from left to right, the small cells in front of the train are added to (a particular cluster of) the SFN, or activated, and afterwards after the train has passed, active base stations are deactivated, or removed from (a particular cluster of) the SFN.

In vehicles, the channel quality may be affected by the car or vehicle design regarding to metal cage, an outer skin of metal and the metal vaporized windows. Therefore, trains are often equipped with repeaters or relay nodes. According to the present invention it is of lesser relevance whether the individual mobile stations are connected directly to the small cells or whether they hold connections with repeaters or a relay nodes being mounted on the train, it may for instance be assumed that on each wagon exactly one repeater or Relay Node is installed. The difference between repeaters and relay node is that a repeater amplifies the connections between the mobile stations in the train and a small cell, while a relay node represents multiple mobile stations externally and hence bundles their connections. The latter may lead to a single connection between a relay node and a small cell. Such a connection should preferably offer a high bandwidth.

The present invention provides a method for avoidance of frequent cell handover procedures for a group of fast-moving mobile phones. Several cells form a single frequency network SFN and resources are assigned depending on the current position and continuously new radio cells are activated and deactivated in the SFN. This can for instance be performed by means of operating single clusters. The adaptions are dynamically performed in dependence of the velocity of the movement behaviour of the vehicle, as it is depicted in FIG. 1.

The appropriate point in time for activating or deactivating a radio cell can be determined in at least three several ways, which is described in the following.

Firstly this can be accomplished by means of position detection. A unit being arranged for determining the position is provided, for instance the position determination unit PDU, which detects a position based on actual active connections between the devices and radio cells. Furthermore measurements of received signal strengths for instance on downlink reference signals can be accomplished by at least one reference device and furthermore by measurements being initiated and/or collected by the mobile network. It is also possible to operate a reference device in the moving vehicle providing Global Navigation Satellite System GNSS functionality, for instance GPS, for performing measurements being suitable for location detection.

Secondly, activation of base stations can be performed by means of cluster partitioning. A cluster partitioning unit, CPU, groups devices for instance by an evaluation result of movement patterns and determines expansion of the SFN to grant the required orthogonality between the different groups of terminals, for instance between the individual SFN clusters. In this case, it can use information being obtained by the position detection unit.

Thirdly, a resource control can be performed. A so-called Resource Control Unit, RCU, may manage the resources (e.g., provided by the Small Cell Layer) on the air interface, for example in the time-frequency grid of LTE or LTE-Advanced, grant the orthogonality between the resources for different mobile devices within an SFN cluster and/or grant orthogonality between SFN clusters. For this purpose the RCU may obtain information from the CPU It will be appreciated that further ways for location detection may be used and may as well combine aspects of the above mentioned techniques. Generally, the required direction and speed information can be obtained in several ways. The exemplary options listed here for determining the position will be described in more detail below.

The functional units described above are to be understood as logical functional blocks. They can be implemented by a common physical unit, such as the one shown in FIG. 2 as the SFN Cluster Management Unit, SFN CMU, or they can be implemented by separated means in a central location. These components can as well be distributed throughout the system, for example as a subdivision of a small cell base station or the Mobility Management Entity, MME. A heterogeneous implementation of centralized and decentralized function blocks, only partially distributed in certain subdivisions in the system, as indicated in FIG. 3, is also feasible. Which implementation is optimal depends largely on the respective embodiment, such as option 1 (centralized), option 2 (decentralized) and option 3 (mixed). Further to the aspects provided above accordingly adapted protocols are suggested for enabling communication among those entities providing the required functionality.

Figure 2:
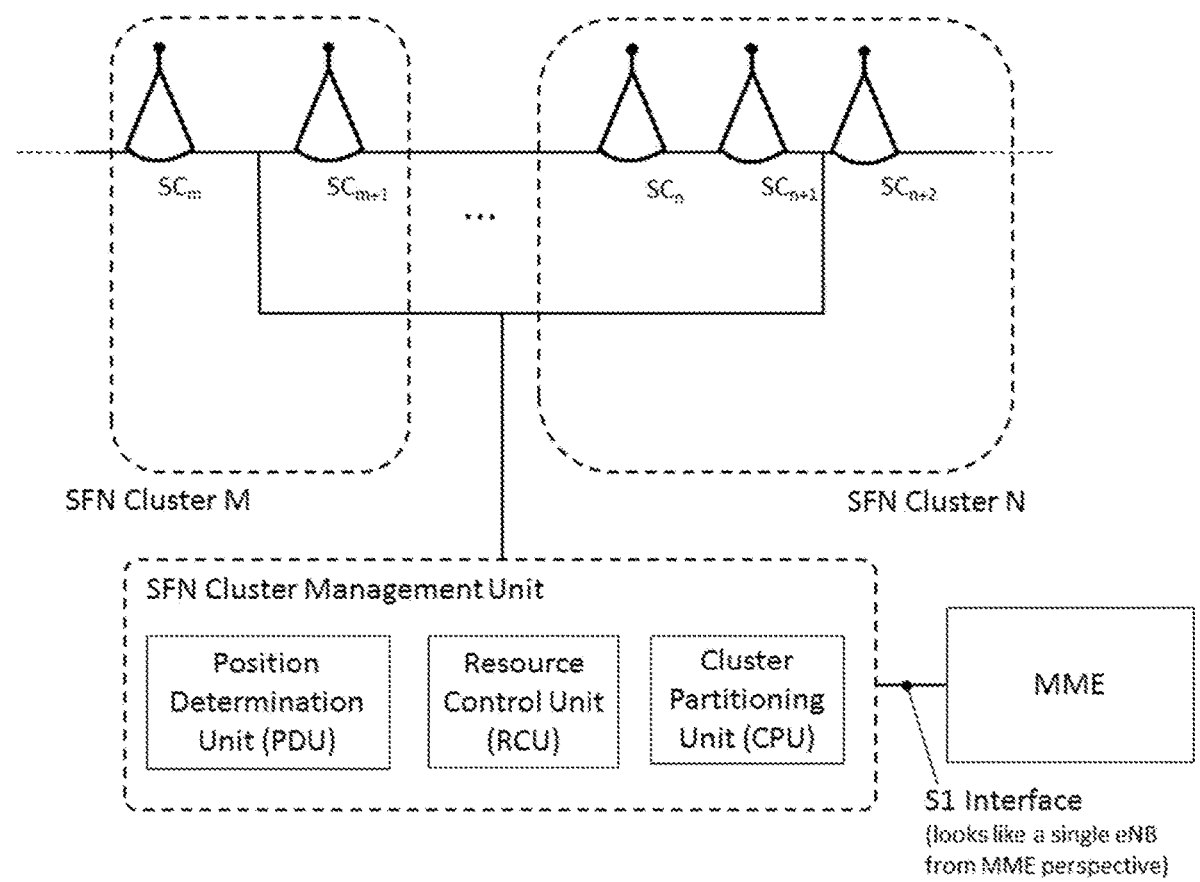
FIG. 2 shows a system for configuring an SFN with respective network components according to an aspect of the present invention.
Figure 3:
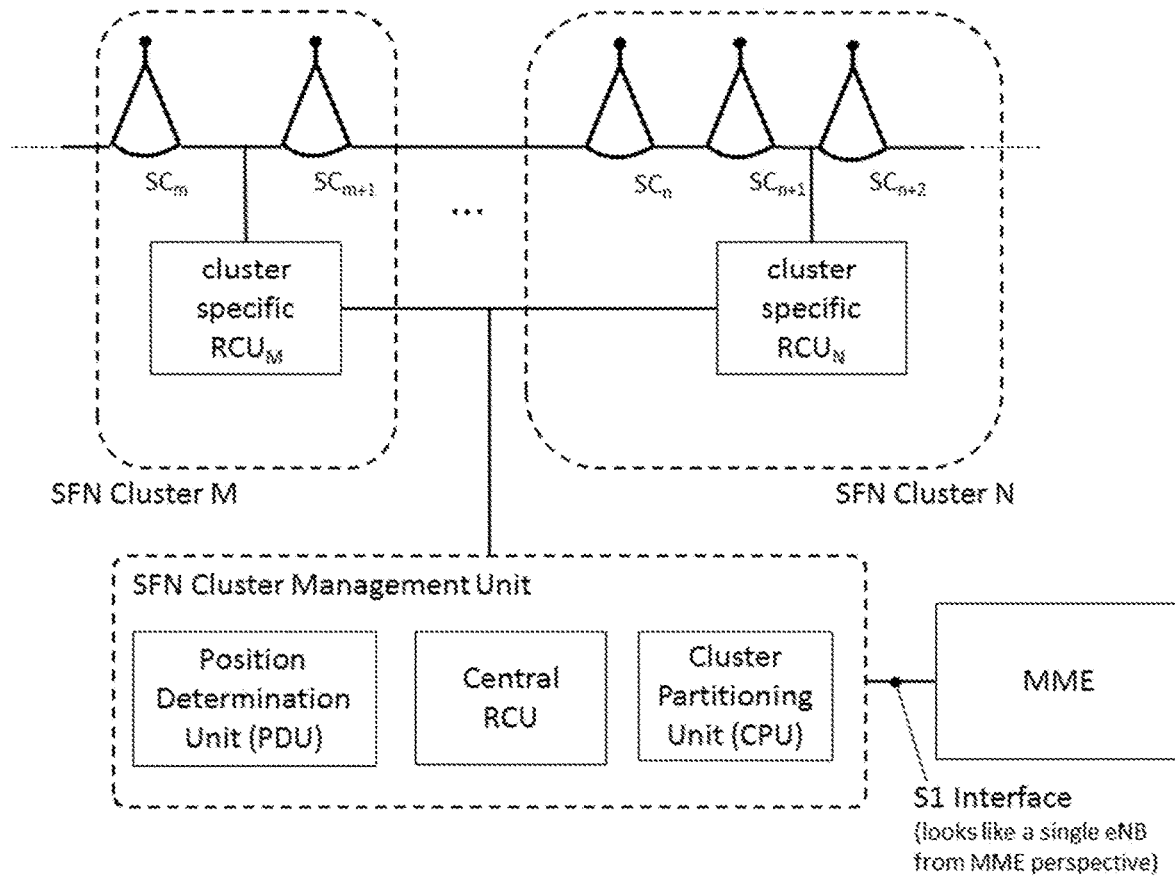
FIG. 3 shows a further system for configuring an SFN with respective network components according to an aspect of the present invention.

FIG. 2 shows the centrally located SFN CMU holding the three above mentioned function blocks for operating the SFN according to option 1 (centralized SFN CMU). This example shows two spatially separated SFN clusters.

According to an aspect of the present invention a division of labour between a central resource allocation unit and at least one local resource allocation unit is accomplished. The central resource control unit, Central RCU, ensures the interference avoidance between the individual SFN clusters. The local resource control unit, referred to as Local RCU or cluster specific RCU, grants the interference avoidance between different devices within an SFN cluster. It can be arranged to implement the scheduling function of the MAC protocol layer. Hence, the local resource control unit RCU controls the behaviour of several transmitters of a SFN cluster, for instance multiple small cells or remote radio heads.

FIG. 3 shows a partially decentralized arrangement of the functional blocks of the SFN CMU for operating the SFN according to the above described option 3. Each SFN cluster x is assigned a local RCUx, which assigns the resources of a resource pool being provided by a centrally "arranged "Central RCU". Furthermore two spatially distant SFN clusters are indicated in this figure.

When activating a new radio cell a respective synchronization information is exchanged, such that the new radio cell can be seamlessly and quickly integrated into the behaviour of an already existing SFN. As a time-normal for granting a high degree of synchronization a time signal being provided by a satellite-based positioning system, such as GPS, can be used.

As part of its activation an added radio cell can be configured to be operated in a specified subset of the SFN, for instance in a certain position dependent SFN cluster. Used parameters are at least the following:
  downlink carrier frequency (dl-CarrierFreq)
  downlink bandwidth (dl-Bandwidth)
  Configuration Details of "Physical Hybrid ARQ Indicator Channel" (phich-config)
  List of mobile network identifiers (PLMN identities)
  Identifying features of the paging area (Tracking Area Code)
  Cell ID features (Cell Identity)
  Uplink carrier frequency (ul CarrierFreq)
  Uplink Bandwidth (ul-Bandwidth)

This list serves only as an example. Eventually less or additional configuration parameters are transmitted, for instance those being applied in the Master Information Block MIB or in different types of System Information Blocks SIBs of the position-dependent SFN.

Hence, a method is suggested providing a new network architecture for the supply of mobile devices based on the use of a single-frequency network for area-wide coverage and device-specific support, without clearly distinguished cells and without a specific predefined serving cell or a certain number of serving cells by the provider. Hence, aspects of cellular mobile radio networking are integrated into a position-based and network-controlled telecommunication scenario. Furthermore, the subject of the present invention provides the features such as a position-dependent allocation of resources for groups of terminals and Small Cells within an SFN, the prevention of cell handover procedures and disconnections especially of fast-moving terminals in the Radio Access Network RAN, the prevention of cell handover procedures and Tracking Area Update TAUs for fast moving terminals in the Core Network CN as well as the formation of cell subsets, such as orthogonal SFN clusters, within an SFN.

Hence, terminals can be served by all receivable cells, provided that they send the signal being meant for the terminal, without a complex multi-cell reception configuration, which leads to a better reception, higher data rates and/or lower channel coding overhead. Furthermore an improved treatment of fast moving terminals by Small Cells in a SFN is achieved with a relatively short air interface, good call quality and high data throughput. The terminal virtually communicates with the same cell as there is no handover and no disconnection. The terminal does therefore not recognize the presence of a cellular network topology comprising multiple cells. In the backhaul of the network, there are also no frequent handovers and no frequent Tracking Area Updates TAUs. The resource allocation may be accomplished without expensive and labour intense positioning methods as the already existing information derived from communication between the terminals and the Small Cells may be used.

In the following further embodiments and aspects of the invention are described, such as:

Part A: Management of resources
Part B: Options for implementing the RCU
Part C: Combining and separating SFN clusters
Part D: Position detection of terminals in IDLE mode
Part E: Activation and Deactivation of Small Cells
Part F: Further aspects of the invention Although being described in different parts for an improved readability the suggested aspects are can be combined for provision of the subject matter of the present invention.

Part A: Management of Resources

The RCU receives requests from small cells regarding resources for individual terminals and serves these requests by allocation of resources, for instance LTE resources. These resources are provided within the requesting small cell and since this is accomplished in an SFN the provision is performed only once even for neighbouring small cells. Neighbouring small cells are for instance those being in a specific geographic radius, for instance within a radius of 2 kilometers. These small cells may form an SFN cluster. Small cells outside this radius, for example outside the SFN cluster may be assigned the same resources for the supply of further user equipment UEs.

Information concerning the specific locations of the terminals and small cells are in an example gathered by a Position Determination Unit PDU. A Cluster Partitioning Unit CPU determines small cells and terminals that are to be summarized as an SFN cluster. Alternatively, the CPU summarizes several small cells of the same movement behaviour and/or location into a group such that terminals can be optimally supplied. The resulting group information is communicated to the Resource Control Unit RCU. The three units PDU, CPU and RCU can be operated individually or as it is shown in FIG. 2 as a single SFN Cluster Management Unit SFN CMU. Furthermore, these units can be summarized for provision of a common functionality of a single physical unit or they can be distributed, for example among the small cells.

Figure 4:
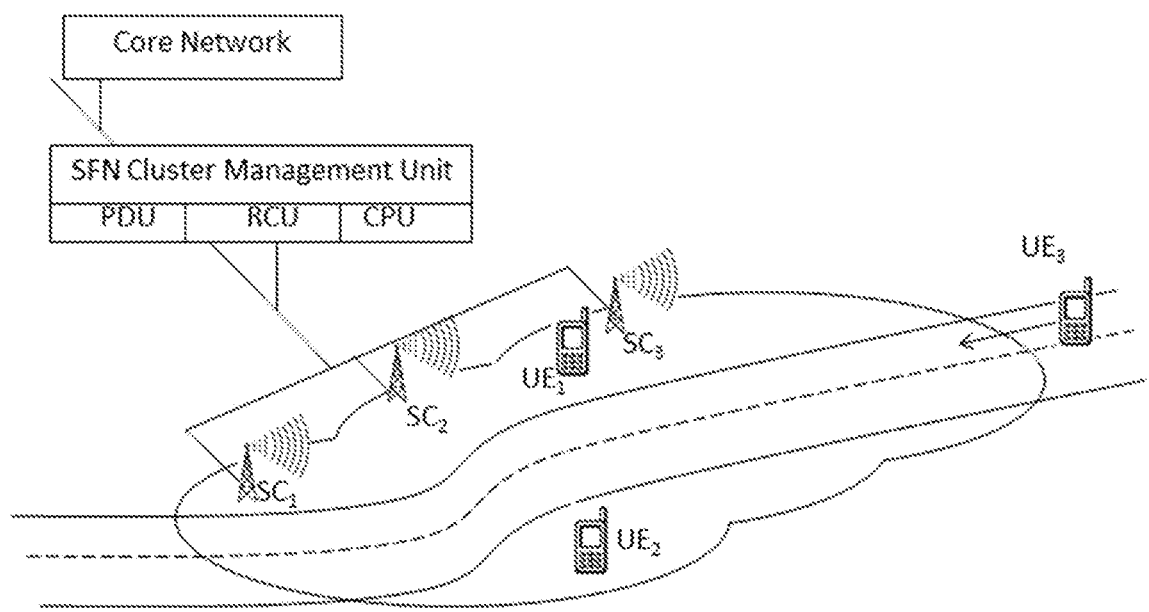
FIG. 4 shows a usage scenario of a system for operating an SFN according to an aspect of the present invention.

FIG. 4 depicts an SFN Cluster Management Unit (SFN CMU) providing at least one of the three sub functions provided by the PDU, RCU or CPU as described above. As shown, $UE_3$ enters an SFN already populated by $UE_1$ and $UE_2$ and thereafter all UEs are managed by the SFN cluster management unit.

FIG. 4 shows in a schematic illustration an SFN cluster management unit providing the three functions PDU, RCU and CPU as described above. FIG. 4 also depicts three small cells, SC1 to SC3, which are forming an SFN. In this exemplary SFN the user equipment UE1 and user equipment $UE_2$ are being served, user equipment UE3 approaches from a position outside of the SFN and will be integrated. FIG. 4 furthermore shows a SFN comprising three radio cells SC1 to SC3, to which UE3 connects. While the formation of SFN clusters is possible the terminals can also be individually supplied. The so-called neighborhood or distance constraints between terminals, which are supplied with the same resources, are determined and considered for the allocation of resources.

Part B: Options for Implementing the RCU

The Resource Control Unit RCU can be implemented at least according to the following three options:

Option 1: resources are assigned centrally: According to FIG. 2, a centrally located unit for resource control RCU assigning resources to all groups of small cells, for instance all SFN clusters of the SFN, and establishes the required orthogonality between the resources for different mobile devices within a SFN cluster as well as the orthogonality required between different SFN clusters. The RCU obtains information and evaluates information received from the cluster partitioning unit CPU.

Option 2: a local RCU is assigned to each SFN cluster: The resource allocation for each SFN cluster is accomplished individually. Hence, orthogonality between the resources for different mobile devices within a SFN cluster can be granted.

Orthogonality between different SFN clusters can be reached by the RCU receiving and evaluating relevant information from the unit for cluster partitioning CPU and continuously sharing information about the allocated resources, especially between adjacent clusters SFN.

Option 3: combining aspects of option 1 and 2 with a predefined resource pool and a local scheduling.

A first unit for resource control RCU, which may be arranged centrally, provides a resource pool to a first group of small cells. A second group of small cells can be assigned an identical or an overlapping resource pool in case it is distant enough to the first group. The first group of small cells can be a dynamically defined, for instance SFN cluster M, which supplies a first train or vehicle in general with the respective terminals, repeaters or relay nodes. Accordingly, the second group of small cells, for instance SFN cluster N, supplies a second train or vehicle. The actually allocated resources for the terminals within each SFN cluster are determined by a second decentralized resource control unit, such as RCUm or RCUn as shown in FIG. 3, out of the resource pools being defined by the Central RCU.

Figure 5:
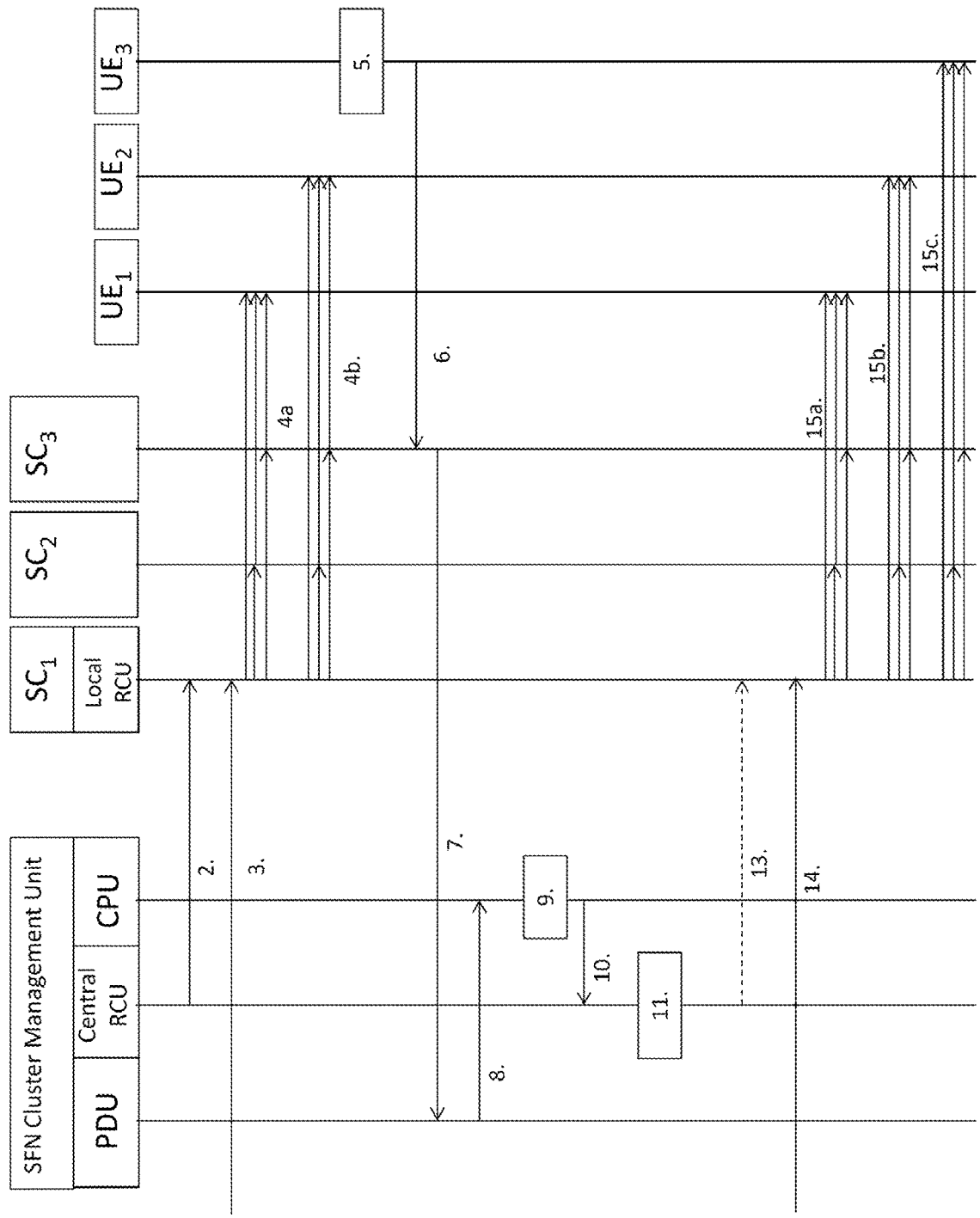
FIG. 5 shows a flow chart diagram providing a method for operating an SFN according to an aspect of the present invention.

An exemplary message flow diagram for option 3 is provided by FIG. 5. The depicted units are those as already presented with reference to FIG. 4. The communication system provides a centrally located resource allocation unit (the so-called "Central RCU") as well as a cluster specific resource allocation unit with scheduler functionality (the so-called "Local RCU"). The latter ensures that the entire data within a cluster is assigned to the individual SFN small cells and is synchronously transmitted under usage of the same resources. This function may be provided by small cell SC1 (as shown in FIG. 5) or by any other unit (not shown in FIG. 5 for sake of simplicity) in the respective SFN Cluster made up of SC1 to SC3. The "Central RCU" may be responsible for coordinating resource usage of multiple (neighbouring) SFN clusters, for instance by taking into account various pieces of information received from the Position Determination Unit PDU and/or the Cluster Partitioning Unit CPU.

FIG. 5 shows an exemplary first message flow diagram concerning option 3 for the scenario being described in FIG. 4. Prior to user equipment UE3 entering the SFN the base stations SC1 to SC3 are combined to form an SFN cluster and the terminals UE1 and UE2 are being served through this SFN cluster. This procedure is determined by the cluster partitioning unit CPU according to an aspect of the present invention. The central resource control unit Central RCU indicates in step 2 to the local RCU, which includes scheduler functionality, the resources for the respective user equipment UEs. In case in step 3 data from the core network are received for transmission to the UEs, the local RCU provides in base station SC1 for a synchronous transmission in all base stations of the SFN cluster to the UEs in steps 4a and 4b.

If user equipment UE3 enters the SFN as already being described with reference to FIG. 5, an UL signaling results in step 6, which can be received by base station SC3. Base station SC3 informs the position determination unit PDU in step 7 either directly, as it is shown in FIG. 5, or via the SFN Cluster Management Unit. The PDU determines the position, in case it is necessary and possible with further information available regarding the movement profile by evaluation of past position reports and reports to the cluster partitioning unit CPU in a further step 8. The CPU integrates UE3 in the cluster and informs the central resource control unit Central RCU in step 10. The Central RCU ensures the supply of UE3 and can therefore reconfigure the resource pools for each SFN cluster in an optional step 13 such that the local RCU in base station SC1 also supplies the newly joint user equipment UE3. In case in a further step 14 data from the core network are received for transmission to UE1 to UE3, which can be transmitted synchronously via the assigned resources in the SFN cluster, the SFN cluster comprising base stations SC1 to SC3. See steps 15a through 15c respectively.

Figure 6:
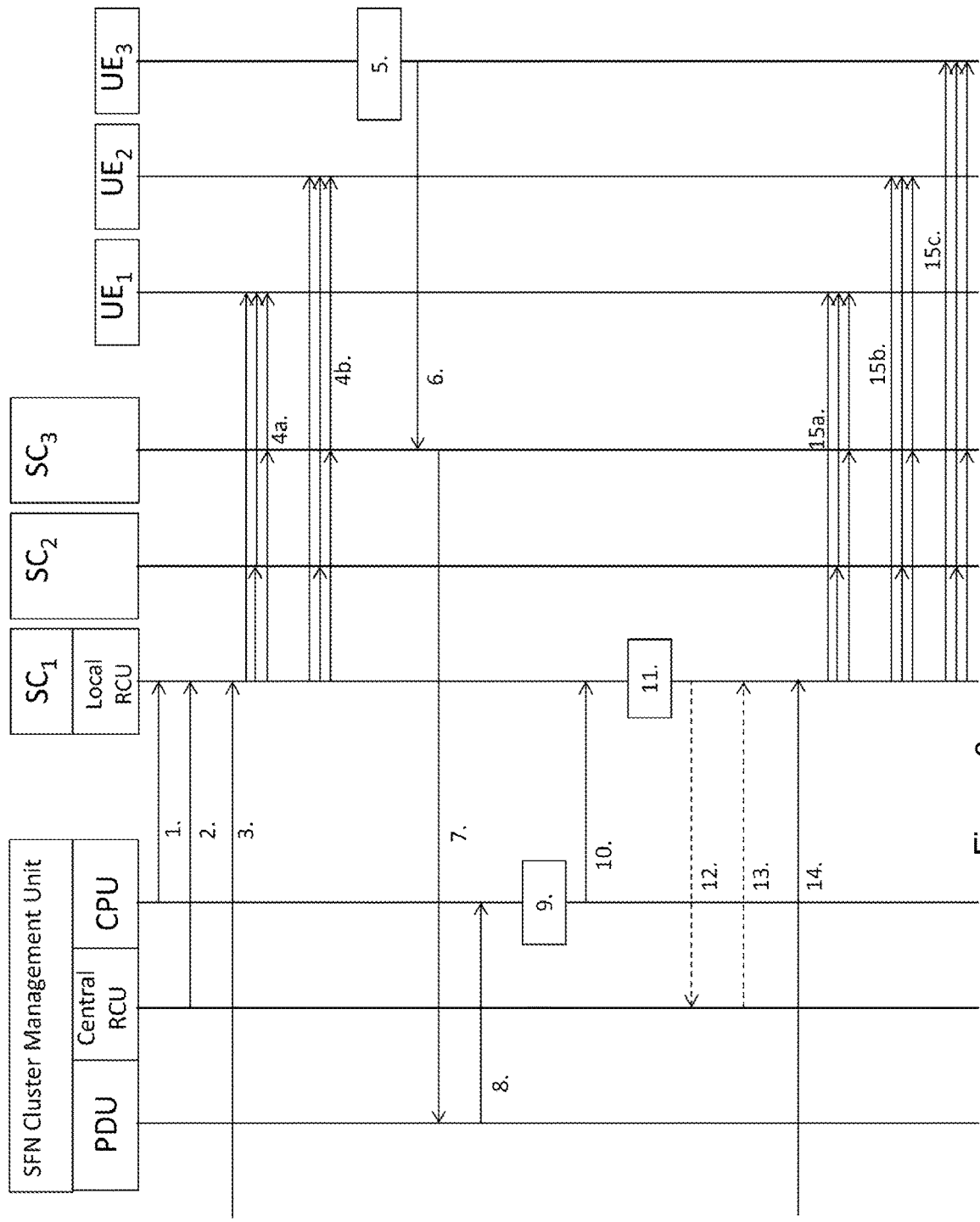
FIG. 6 shows a further flow chart diagram providing a method for operating an SFN according to a further aspect of the present invention.

A further message flow diagram for option 3 is shown in FIG. 6. Hence, in the following only additional aspects regarding the previously presented FIG. 5 are specified. As the resources for the SFN cluster are controlled by a local RCU (or "cluster-specific RCU"), see FIG. 4, for instance by base station SC1, the CPU must inform the local RCU about which cells and UEs belong to each of the SFN clusters. This may be performed in step 10.

FIG. 6 shows a further exemplary second message flow diagram regarding option 3 for the scenario being depicted in FIG. 4.

The Local RCU in base station SC1 checks whether the resources by which the UEs in the SFN cluster are supplied, are sufficient even after an adaption and if required demands additional resources in step 12 from the central resource control unit Central RCU. The Central RCU can respond in a step 13 by providing additional resources. In case data from the core network are received for transmission to UE1 to UES in step 14, which can be transmitted synchronously via the assigned resources in the SFN cluster, the SFN cluster comprising the base stations SC1 to SC3. See steps 15a through 15c respectively.

Part C: Combining and Separating SFN Clusters

It may occur that the orthogonality requirement is not fulfilled due to a too short distance, for instance in case vehicles are approaching and/or are overtaking. In this case, the RCU may split the resource pools or the individual resources such that orthogonality is reestablished. Regarding LTE this may happen by means of a beneficial resource allocation in the time/frequency grid. This is shown in FIGS. 7A to 7C.

Figure 7A:
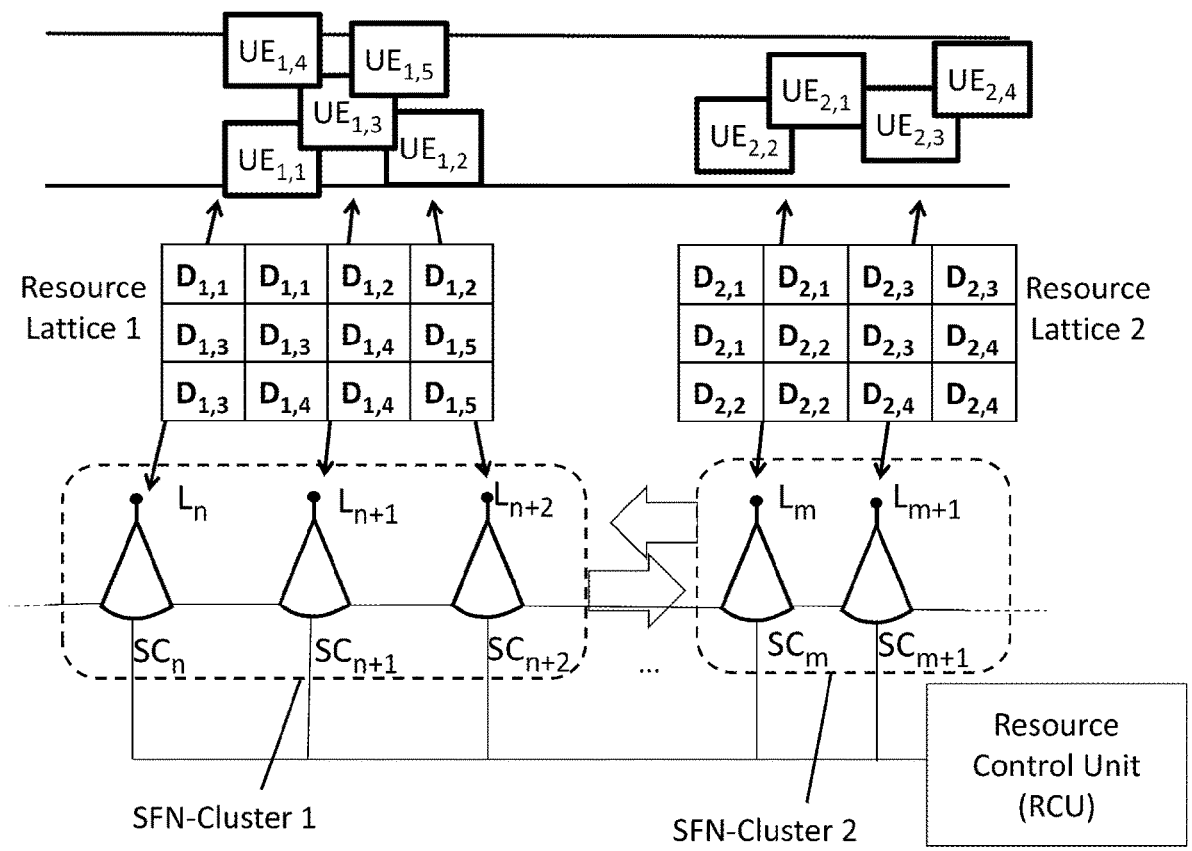
FIG. 7A shows an establishment of user equipment clusters according to an aspect of the present invention.
Figure 7B:
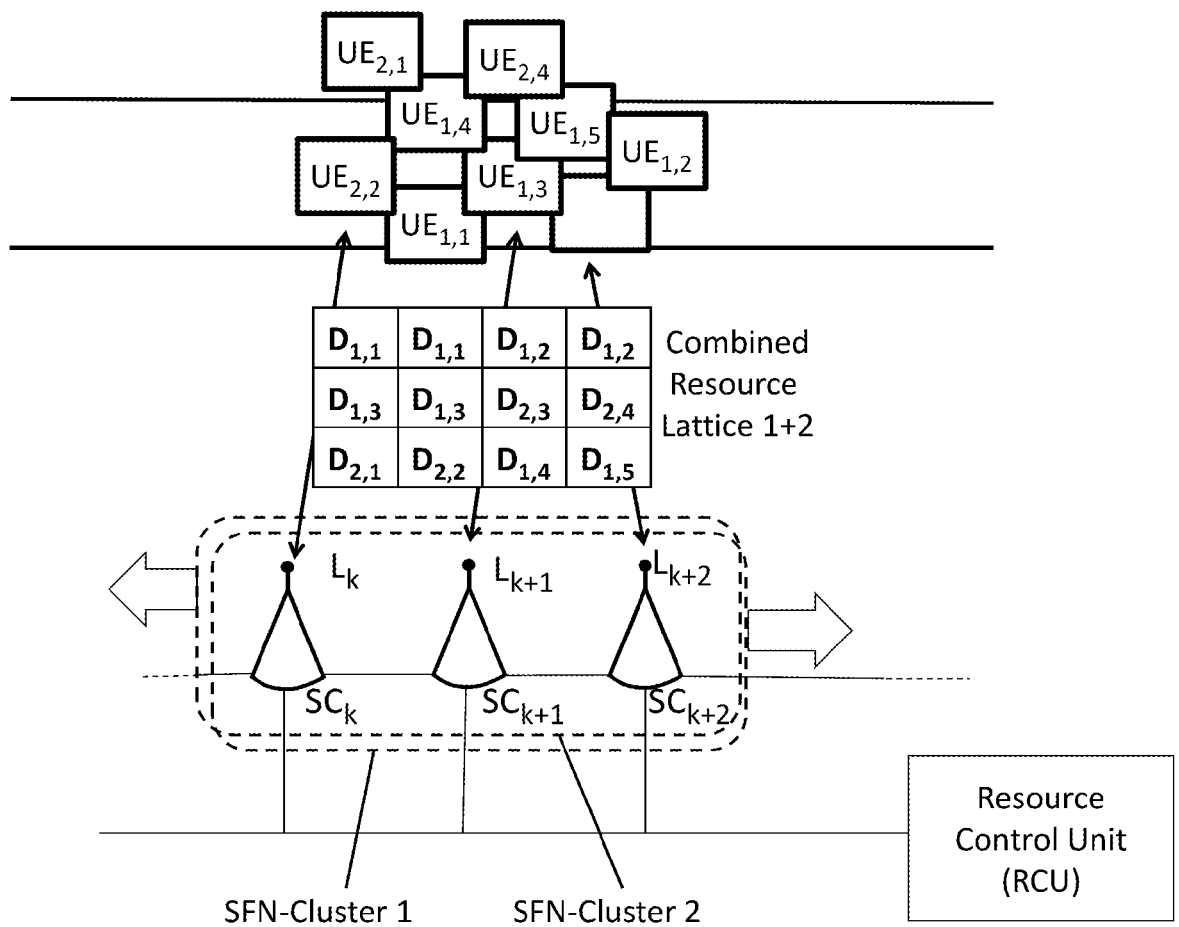
FIG. 7B shows an establishment of further user equipment clusters according to a further aspect of the present invention.
Figure 7C:
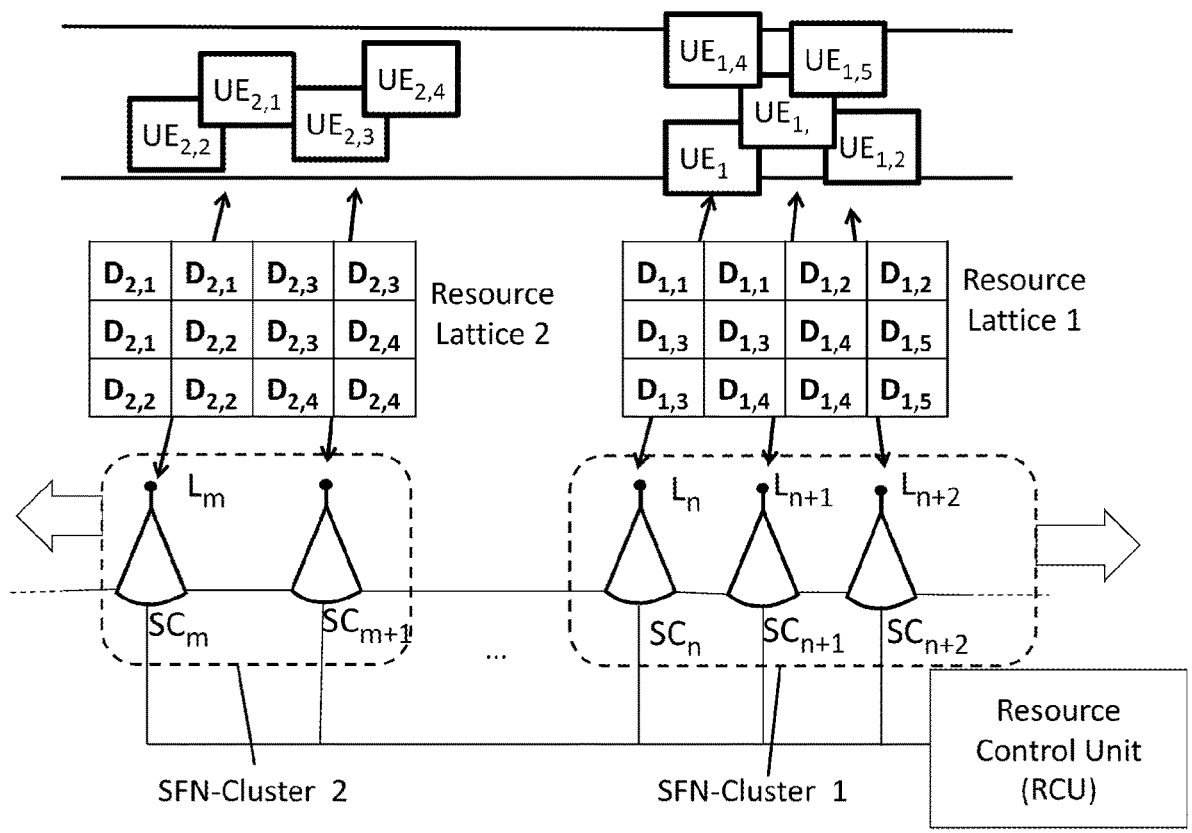
FIG. 7C shows an establishment of further user equipment clusters according to a further aspect of the present invention.

FIG. 7A shows a SFN cluster 1, effectively moving to the right and a further SFN cluster 2, effectively moving to the left. Due to the sufficiently large distance between the two groups of terminals the resources in the corresponding SFN clusters are orthogonal to each other at this point in time. As will be understood, it is the groups of terminals which are moving, rather than the clusters but because of continual activation and deactivation of the small cells forming the clusters, there is a virtual movement of the clusters.

Dx,y denotes a resource of the time/frequency grid of LTE or LTE-Advanced, for example a resource block or a resource element or even a different grouping of carrier frequencies and time intervals. The first index "x" refers to the SFN cluster, the second index "y" identifies a UE within a group of end devices. D23 refers to the resource in the respective time frequency grid being allocated for the third end device UE23 from the second SFN cluster. The same index is used for the end devices.

FIG. 7A shows two SFN clusters, which are effectively approaching to each other, for instance groups of terminals on a street or on two parallel railroad tracks. SFN cluster 1 moves to the right, while SFN cluster 2 moves to the left. Due to the sufficiently large distance between the two SFN clusters to each other the allocated resources are still orthogonal regarding the two affected SFN clusters. The Cluster Partitioning Unit CPU can already derive from the information received from the Position Determination Unit PDU that both moving SFN clusters are approaching and that a reconfiguration of resources will be necessary in the near future. Hence, the RCU can prepare for combining the two subsets of the SFN clusters 1 and 2 regarding allocated resources. The allocated resources can overlap in whole or in part for the duration of the meeting.

FIG. 7B shows SFN cluster 1 and SFN cluster 2, which are in the same place or may at least overlap partially. The RCU establishes orthogonality between the SFN clusters upon combining the two resource grids.

FIG. 7B shows the location where the two SFN clusters 1 and 2 overlap. Because at this point the relative distance is too short no orthogonality is established between the two affected resource grids 1 and 2. Thus, for supplying the terminals of both groups in an interference-free way the Resource Control Unit RCU needs to reallocate the resources timely. In the case of LTE/LTE-Advanced, this is accomplished within the time frequency grid as shown in FIG. 7B: The "Combined Resource Lattice 1+2" contains resources being used by terminals of both SFN clusters. As the resources of each time/frequency grid are limited, it may happen that in the combined time/frequency grid end devices can only use less resources than before, for example UE1.3; UE1.4 and UE1.5 in group 1 and all terminals UE 2, z in group 2.

FIG. 7C again shows SFN cluster 1 moving to the right and SFN cluster 2 moving to the left. The groups of terminals have now passed each other and the distance between both clusters again establishes orthogonality. The distance between the two SFN clusters is again sufficiently large such that the available resources of the time/frequency grid are orthogonal between the two affected SFN clusters. Therefore, the Cluster Partitioning Unit CPU triggers, based on the information that it receives from the Position Determination Unit PDU, a separation of the two SFN clusters by a reconfiguration of resources. The allocation of resources after the separation can be the same as it was before the meeting of the two terminal groups, as shown in FIG. 7A. It may furthermore be required to introduce so-called Guard Regions as unused protective areas as described in the following.

Figure 8A:
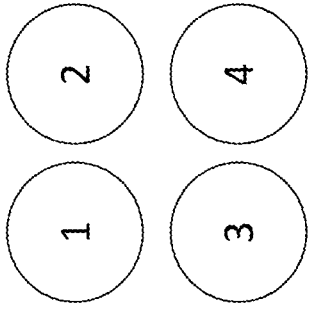
FIG. 8A shows a long term evolution LTE time/frequency grid according to an aspect of the present invention.
Figure 8B:
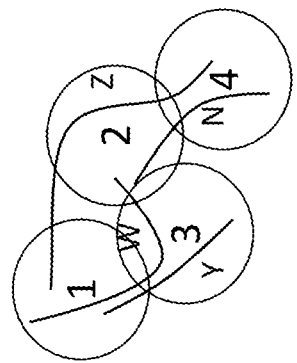
FIG. 8B shows a further long term evolution LTE time/frequency grid according to a further aspect of the present invention.

FIGS. 8A and 8B show two different network topologies. FIG. 8A demonstrates a lack of overlap. Guard Regions are not required in this example. FIG. 8B demonstrates a partial overlap with Guard Regions. FIG. 8A shows an exemplary LTE time frequency grid for four non-overlapping cells. The letters W, X, Y, . . . in FIGS. 8A and 8B denote resources for a terminal or a terminal group.

FIG. 8A demonstrates a lack of overlap. In the present FIG. 8A the following reference signs are used for illustration of an aspect of the present invention:

E, F, G, H, K, M, J and/or X: present only in one resource lattice.

W, Y and/or N: present in two (neighbouring) resource lattices.

Z: present in three (neighbouring) lattices.

FIG. 8B shows an exemplary LTE time/frequency grid for four partially overlapping cells covering an area. In the present FIG. 8B the following reference signs are used for illustration of an aspect of the present invention:

J, M, X: present only in one resource lattice.
N, Y: present in two (neighbouring) resource lattices.
W, Z: present in three (neighbouring) lattices.
Guard regions are indicated b Since the coverage areas of the radio cells 1 and 3 as well as the coverage areas of radio cells 3 and 2 partially overlap in FIG. 8B (while radio cells 1 and 2 do not overlap), those resources that are already used at location #1 and/or #2 cannot be used at location #3 for other terminal groups.

A resource allocation for an area can be highly dynamic. Hence, the establishment of protection areas may be very dynamic. Such protection areas can be established by guard regions, which are located between two small cells or between clusters for avoidance of interference. These regions assure that neighbouring entities such as small cells and/or clusters of small cells remain orthogonal regarding the used transmission resources.

Part D: Position Detection of Terminals which are in IDLE Mode

The position dependent resource allocation, in groups of terminals/small cells or individually, does typically not require complex location detection techniques and can rely on already existing information about devices communicating with small cells. This applies to terminals which are operated in a CONNECTED mode. The position of terminals in the IDLE mode, which communicate based on timer in an uplink connection with the small cell need to be estimated. As they move along with a lot of further devices, at least one of them will communicate on the uplink, such that after a few uplink connections, so-called Tracking Area Updates, a local relation between these devices and the movement of single terminals of a SFN cluster can be derived. Hence, the cluster partitioning unit CPU can estimate the position or the subset of small cells, which are required for serving the end devices. Alternatively, terminals being arranged to locate their own position may inform the network when leaving a specific range for instance a previously defined range.

Part E: Activation and Deactivation of Small Cells

For a controlled activation and deactivation of the small cells, especially in scenarios where an operation is not needed for a certain period of time, at least the following procedures can be applied:

1) Procedures based on neighborhood relations

The small cells are connected among themselves and hold information about the respectively adjacent small cell. Each cell may be operated according to one of the following approaches:

Each activated small cell, which already runs or is about to establish an uplink connection with at least one further terminal activates a number of n nearby small cells.

Each activated small cell holding no uplink connection to a neighbouring cell for a specific period of time t notifies a specific number of m nearest neighbouring small cells.

Each activated small cell along with a specific number of k neighbouring small cells, which do not have an uplink connection for a specific period of time t are deactivated and the respectively neighbouring small cells are informed as well.

In this way, in front of each train a so-called wave of activated small cells is preceding and afterwards a wave of deactivated small cells is following. The parameters n, m, k and t are either fixed or are defined in dependence of the current or average speed of the devices.

Figure 9:
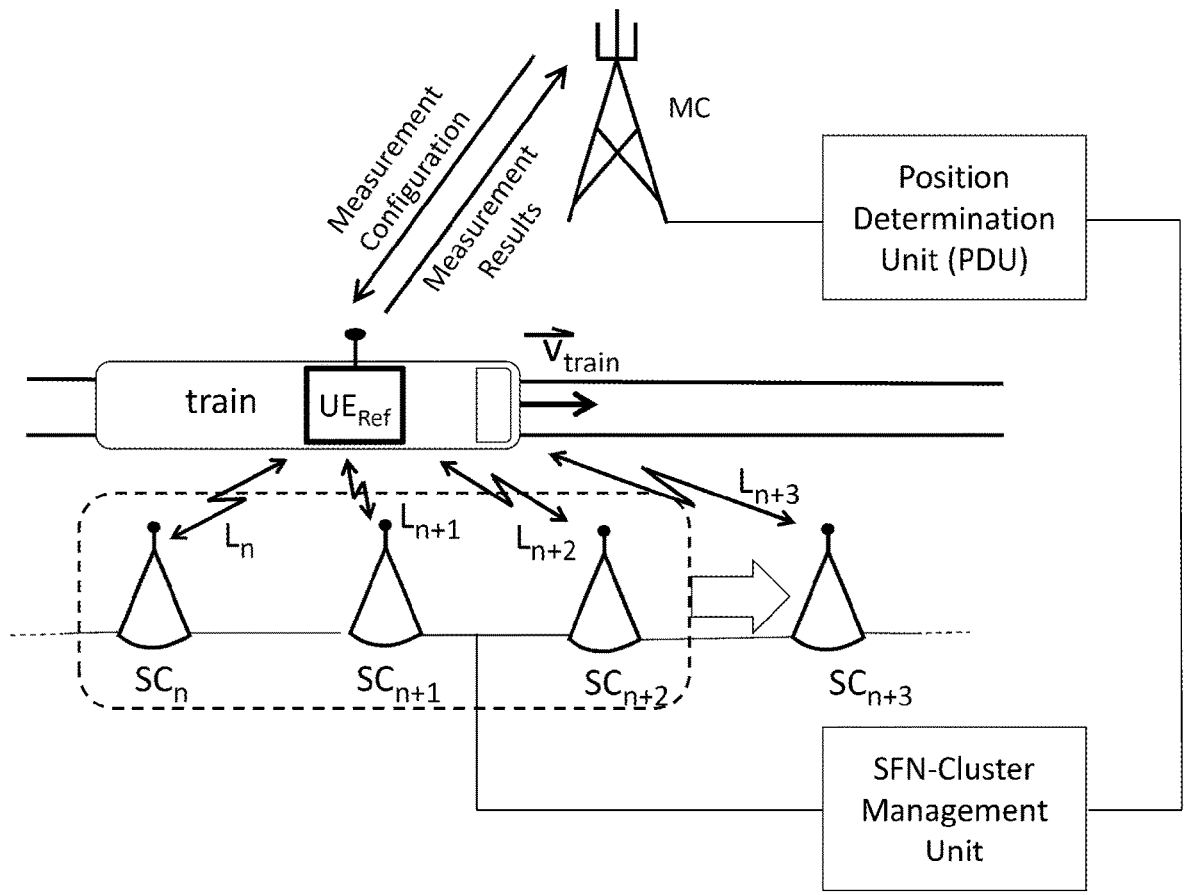
FIG. 9 shows signalling aspects for position determination by a reference device according to a further aspect of the present invention.

2) Procedures based on measurements of the radio cells of the small cell layers. In a train or vehicle in general a mobile station is carried, a so-called a reference device, which is configured to regularly perform downlink signal strength measurements on the small cell layer. Between the Radio Access Network RAN, which is the recipient of the measurement results, and the position determination unit PDU this information (or location information derived from that information) is exchanged. Furthermore, control signals are exchanged between the PDU and the SFN cluster management unit, which in this example, comprises the Cluster Partitioning Unit CPU and the Resource Control Unit RCU, as shown in FIG. 9. Here, a train may carry a reference mobile device ($UE_{Ref}$) and the measurement configuration and reporting may be done exclusively on the macro cell layer. As a consequence the PDU may derive information about the location of a (group of) mobile device(s) from said macro cell MC, or from the mobile network operator's network domain (e.g., radio access network RAN and/or core network CN) in general.

FIG. 9 shows signalling aspects for position determination by a reference device, which is carried in a group of further devices. The configuration and transfer of measurement results can be carried out by a macro cell MC.

As shown in FIG. 9, a train may carry a reference mobile device ($UE_{Ref}$) that may be configured to measure downlink signal strength. Measurement configuration and reporting may be done exclusively on the Macro Cell MC layer. As a consequence the PDU may derive information about the location of the reference mobile device ($UE_{Ref}$) from the mobile network operator's domain (e.g., radio access network RAN and/or core network CN).

Alternatively, the measurement configuration and reporting may be performed over the small cell layer itself, which is not shown in FIG. 9.

Measurements over the Macro Cell layer concern inter-frequency measurements while measurements over the small cell layer concern intra frequency measurements.

The network may be arranged to distinguish the measurement results of the at least one reference device from those of the further mobile devices. This can be implemented through an analysis of the results of the downlink signal strength measurements, ideally before sending them to the network. For instance, the measurement results may be designated by the reference device or the corresponding mobile terminal itself is, ideally when registering on the network, marked as the reference device.

The reference mobile device $UE_{Ref}$ could be an autonomous device installed in the train and logically linked to other UEs identified as moving in a correlated manner with $UE_{Ref}$. The reference mobile device could alternatively be in the form of a repeater or relay station, with connections to the UEs within the train carriage being made through this repeater or relay station.

When transferring measurement results to a base station, each radio cell of the small cell layer is to be clearly identified by an individual characteristic in the measurement results, for example a SFN transmission point identifier. The use of separate cell ID is also possible. Since the identities of all the radio cells along the railway line are known on the network side are, the measurement results of the reference device can be evaluated as follows. Those radio cells of the small cell layer with increasing downlink signal strength, can be added to the respective SFN cluster, wherein those radio cells of the small cell layer with a decreasing reception field strength are removed from the respective SFN cluster.

In order for the mobile terminals to uniquely identify a distinct radio cell in an SFN cluster, dissemination of individual SFN transmission point identifiers (for instance, separate cell IDs) in downlink direction may be enabled. These various SFN transmission point identifiers may be sent on a set of shared downlink resources, or even on exactly the same downlink resource (e.g., using a common set of time slots/frames and/or a common set of frequencies) provided by the group of radio cells forming the SFN cluster, while each radio cell transmits its own SFN transmission point identifier. It may therefore be beneficial to use orthogonal codes (e.g., pre-defined bit sequences of a certain length with suitable auto- and cross-correlation properties) in the sending radio cells (as well as in the receiving mobile terminals). Said orthogonal codes may be used

- as individual SFN transmission point identifiers themselves (i.e. orthogonal codes may represent the radio cells' individual cell IDs); or
- for performing spreading operations on the individual SFN transmission point identifiers (i.e. Code Division Multiplexing methods may be used for dissemination of separate cell IDs on the same radio resource); or
- for performing cyclic shift operations (e.g., with radio cell specific timing offsets) on individual SFN transmission point identifiers; or
- for combinations of the above.

Doing so would enable the receiving terminals to derive the individual SFN transmission point identifiers after transmission over the air, simply by applying the correlation properties of the codes/sequences used. The mobile terminal may then include (information about) the detected individual SFN transmission point identifier in its measurements report or in any other suitable uplink message.

3) Based on a position being detected on the network side

The network may periodically determine the position and velocity of the mobile device being mounted on a vehicle, the so-called reference device, for example by means of a network based positioning procedure. Control information may then be exchanged between the entity in charge of performing network based positioning methods and at least one unit from the list of position determination unit PDU, the Cluster Partitioning Unit CPU and the Resource Control Unit RCU.

The information such that a particular mobile device is attached to a vehicle can be stored on the network side.

Generally the geographical locations of the radio cells of the SFN along the railway line are known. Hence, using the determined position of the train by the SFN Cluster Management Unit the radio cells of the small cell layer can be added to the respective SFN cluster along the planned route of the train and/or no longer used radio cells of the small cell layer are deactivated after the train or vehicle has passed.

4) Based on the position being determined by the train or generally vehicle itself. The train itself can provide a GNSS module such as GPS which measures the current position (and speed) and a wireless module which reports the position (and speed) measurements possibly along with assistance data pertaining to the train's current or predicted position, speed, trajectory, or heading to the network in regular intervals. The reported position data is provided to the SFN Cluster Management Unit The information can be provided more frequently and/or with a higher accuracy at low speeds than as it can be provided at higher speeds, The information indicating that a particular mobile device is associated with a fast moving vehicle can be stored in the mobile network operator's domain (e.g., radio access network RAN and/or core network CN). Terminals with different movement behaviour such as cars with a rather chaotic behaviour, traits with exact routes and fixed timetable can be assigned a different periodicity of position detection. Alternatively, such information can be derived from the transmitted information, since both the route and the timetable are known on the network side.

The person skilled in the art appreciates that aspects of the aforementioned approaches for activation and/or deactivation of Small Cells can be combined or enhanced with further techniques.

Hence, a position dependent selection of a subset of cells of the SFN accompanies the train traveling at the same speed as the train along the railway. Mobile devices, repeaters or relay nodes that are carried in a train can be served by the small cell layer for a long period of time without cell transfer procedures to other cells, such as handovers, and without transfers to other frequency layers.

Part F: General Aspects

The present invention also covers groups of terminals, which cannot be clearly separated from each other as it is the case with terminals in one train and further terminals in another train. Considering a highway scenario, the Cluster Partitioning Unit CPU and the Position Determination Unit PDU recognize which terminals are located on which part of the highway. In the event that resources are not allocated for a longer period of time, a prediction of the movement, comprising direction and speed, is carried out to ensure orthogonality with other devices. Groups of terminals moving uniformly can be defined, which may be more dynamic than the corresponding groups in the aforementioned train scenario. The described aspects can as well be used for autonomous driving scenarios and consider movement behaviour such as speed, acceleration, braking, choice of lane, choice of route and the like. Hence, coordination with other devices to form a convoy or a line of cars moving at the same speed can be performed.

A further aspect of the present invention is to support independently moving devices, for instance in a known mobile network to cover an area of particular interest, such as a downtown location. The resource allocation is performed based on the position of the individual terminal, which can be determined by the terminal itself or a base station by receiving the uplink signal, or by other means.

The person skilled in the art appreciates further ways to implement the subject matter of the present invention. The described methods can for instance be accomplished by respective telecommunication protocols and can be stored on at least one storage medium by means of storing instructions for performing the method steps. Several of the suggested user equipment can be operated to jointly provide a telecommunication system, if necessary under communication with further network devices.

The invention claimed is:

1. A method for configuring individual base stations of a plurality of base stations to form a first single frequency network and a second single frequency network, where individual base stations forming each of the first single frequency network and the second single frequency network share transmission resources, the method comprising:

detecting locations of a plurality of user equipment (UE) devices;

forming a first grouping of UE devices and a second grouping of UE devices from the plurality of UE devices following an evaluation of movement patterns of the plurality of UE devices;

configuring at least one transmission parameter of the individual base stations of the plurality of base stations to form the first and second single frequency networks to serve the first and second groupings of UE devices and adapting selections of base stations forming the first and second single frequency networks as a function of a movement of the first and second groupings of UE devices, wherein a first set of individual base stations forming the first single frequency network simultaneously transmit the same signal to the first grouping of UE devices using a first radio transmission resource pool and a second set of individual base stations forming the second single frequency network simultaneously transmit the same signal to the second grouping of UE devices using a second radio transmission resource pool, and wherein initially the base stations in the first set of individual base stations are not part of the second set of individual base stations; and using a reduced sub-set of radio transmission resources of the first and second radio transmission resource pools for communication with the first and second groupings of UE devices when it is determined based on a movement of at least one of the first and second groupings of UE devices that at least one base station from the first set of individual base stations forming the first single frequency network should be part of both the first set of individual base stations forming the first single frequency network and the second set of individual base stations forming the second single frequency network.

2. The method of claim 1, wherein at least one determined base station of the first set of individual base stations is activated to join the first single frequency network in response to the first grouping of UE devices approaching the at least one determined base station.

3. The method of claim 1, wherein at least one determined base station of the first set of individual base stations is detached from the first single frequency network in response to the first grouping of UE devices moving away from the at least one determined base station.

4. The method according to claim 1, wherein the first single frequency network is partitioned into clusters made up of operating subsets of base stations using respective orthogonal resources.

5. The method according to claim 1, wherein the locations are detected repeatedly for estimating the movement patterns.

6. The method according to claim 1, wherein detecting the location locations is accomplished repeatedly according to one of a predefined schedule, predefined periods of time, and a predefined user equipment behaviour profile.

7. The method according to claim 1, wherein detecting the location locations comprises at least one of: detecting a presence of the user equipment plurality of UE devices, detecting a location of the user equipment, detecting a trajectory, detecting a direction of movement, detecting a movement behaviour, detecting a handover event, detecting a cell reselection event, estimating a movement behaviour, reading out a provided movement profile, and considering an estimated movement profile.

8. The method according to claim 1, wherein configuring the at least one transmission parameter comprises:

forming a first cluster of base stations being operated according to a first set of transmission parameters, and forming at least a second cluster of base stations being operated according to a second set of transmission parameters.

9. The method according to claim 1, wherein a first cluster of base stations is activated as a function of the detected locations, and wherein a second cluster of base stations is deactivated as a function of the detected locations.

10. The method according to claim 1, wherein plurality of UE devices are operated according to one of a group of standards, the group of standards comprising GSM, UMTS, LTE, and IEEE 802.11.

11. The method according to claim 1, wherein one UE device of the first grouping is determined to be a reference device for the first grouping and wherein a determined movement of the reference device is used to establish the movement of the first grouping.

12. The method according to claim 11, wherein the reference device is a UE device installed in or on a vehicle.

13. The method according to claim 12, wherein the reference device is identifiable as such on an infrastructure side of the mobile communication network by identification of a known device identifier or other marker.

\* \* \* \* \*